(12) United States Patent
Kuwajima

(10) Patent No.: US 8,435,456 B2
(45) Date of Patent: May 7, 2013

(54) $NO_x$ ADSORBING APPARATUS AND EXHAUST-GAS CONVERTING APPARATUS

(75) Inventor: Masamichi Kuwajima, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 328 days.

(21) Appl. No.: 12/812,096

(22) PCT Filed: Dec. 26, 2008

(86) PCT No.: PCT/JP2008/073827
§ 371 (c)(1),
(2), (4) Date: Jul. 8, 2010

(87) PCT Pub. No.: WO2009/087935
PCT Pub. Date: Jul. 16, 2009

(65) Prior Publication Data
US 2010/0287918 A1    Nov. 18, 2010

(30) Foreign Application Priority Data
Jan. 9, 2008  (JP) .................................. 2008 002078

(51) Int. Cl.
*B01D 50/00*   (2006.01)

(52) U.S. Cl.
USPC ........................................................ 422/177

(58) Field of Classification Search ................ 422/177, 422/180
See application file for complete search history.

(56) References Cited

U.S. PATENT DOCUMENTS

| 6,391,822 B1 | 5/2002 | Dou et al. |
| 2005/0020443 A1 | 1/2005 | Wei et al. |

FOREIGN PATENT DOCUMENTS

| EP | 935055 A2 * | 8/1999 |
| EP | 1 027 919 | 8/2000 |
| JP | 7-166854 | 6/1995 |
| JP | 8-281106 | 10/1996 |
| JP | 10-146528 | 6/1998 |
| JP | 10-263368 | 10/1998 |
| JP | 2000-230414 | 8/2000 |
| JP | 2001-198455 | 7/2001 |

(Continued)

OTHER PUBLICATIONS

International Search Report for PCT/JP2008/073827, mailed Mar. 31, 2009.
Extended European Search Report for EP Appl. No. 08869748.7 dated Jan. 12, 2011.

*Primary Examiner* — Tom Duong
(74) *Attorney, Agent, or Firm* — Finnegan, Henderson, Farabow, Garrett & Dunner, LLP

(57) ABSTRACT

A first $NO_x$ adsorption material 20 exhibiting a peak temperature being 200° C. or less at which an elimination amount of adsorbed $NO_x$ becomes the maximum is put in place on an exhaust-gas upstream side, and a second $NO_x$ adsorption material 21 exhibiting a peak temperature surpassing 200° C. at which an elimination amount of adsorbed $NO_x$ becomes the maximum is put in place on an exhaust-gas downstream side of the first $NO_x$ adsorption material 20. In low-temperature region, $NO_x$ are adsorbed on the first $NO_x$ adsorption material 20; and, in high-temperature region, $NO_x$ having been eliminated from the first $NO_x$ adsorption material 21 are adsorbed on the second $NO_x$ adsorption material 21 again. Therefore, it is possible to adsorb $NO_x$ form low-temperature region and up to high-temperature region efficiently, and thereby an amount of $NO_x$ being discharged from an $NO_x$ reduction catalyst to be put in place on a downstream-side thereof is reduced.

5 Claims, 4 Drawing Sheets

FOREIGN PATENT DOCUMENTS

| | | |
|---|---|---|
| JP | 2001-289035 | 10/2001 |
| JP | 2002-126453 | 5/2002 |
| JP | 2007-75707 | 3/2007 |
| JP | 2007-160168 | 6/2007 |

* cited by examiner

Length of 1st NOx Adsorption Material/Overall Length of Honeycomb Substrate

$NO_x$ ADSORBING APPARATUS AND EXHAUST-GAS CONVERTING APPARATUS

CROSS-REFERENCE TO RELATED APPLICATIONS

This application is a national phase application of International Application No. PCT/JP2008/073827, filed Dec. 26, 2008, and claims the priority of Japanese Application No. 2008-002078, filed Jan. 9, 2008, the contents of both of which are incorporated herein by reference.

TECHNICAL FIELD

The present invention relates to an $NO_x$ adsorbing apparatus, which adsorbs $NO_x$ in exhaust gases from automobile efficiently from low-temperature region and up to high-temperature region, and which improves an $NO_x$ conversion ratio in $NO_x$ reduction catalyst to be put in place on a downstream side thereof remarkably; and an exhaust-gas converting apparatus, which uses that $NO_x$ adsorbing apparatus.

BACKGROUND ART

As catalysts for reducing and then converting $NO_x$ that are included in exhaust gases from lean-burn engines of automobile, the following have been known: lean $NO_x$ catalysts, $NO_x$ storage-and-reduction catalysts, $NH_3$ denitration catalysts, $NO_x$ selective reduction catalysts, and the like. Of these, lean $NO_x$ catalysts are used mainly in exhaust gases of diesel engine; and they reduce and then convert $NO_x$ by means of reducing agent, such as light oil, which is added into the exhaust gases.

The $NO_x$ storage-and-reduction catalysts use $NO_x$ storage materials, such as alkali metals and alkaline-earth metals; have the $NO_x$ storage materials store $NO_x$ in lean atmospheres; and thereafter the ambient atmospheres are turned into rich atmospheres, thereby reducing and then converting $NO_x$ being released from the $NO_x$ storage materials by means of reducing components that exist abundantly in the ambient atmospheres.

Moreover, the $NH_3$ denitration catalysts reduce $NO_x$ by means of $NH_3$, which is generated by adding urea water and the like into exhaust gases, as set forth in Japanese Unexamined Patent Publication (KOKAI) Gazette No. 10-146,528, for instance.

However, in the lean $NO_x$ catalysts and $NO_x$ storage-and-reduction catalysts, there might be such a problem that $NO_x$ have been discharged as they are because it is difficult to reduce $NO_x$ in regions where the temperature is at around or lower than about 250° C. at which supported noble metals, such as Pt, are activated. Moreover, in the $NH_3$ denitration catalysts as well, lowering the activated temperature has been carried out by using noble metals like Pd combinedly, because the temperature at which $NH_3$ and $NO_x$ react with each other is high originally. However, even in this case, it is difficult to convert $NO_x$ up to the activation temperature at which the noble metals are activated, similarly to the lean $NO_x$ catalysts and $NO_x$ storage-and-reduction catalysts.

Hence, in Japanese Unexamined Patent Publication (KOKAI) Gazette No. 2000-230,414, the following are proposed: putting an $NO_x$ adsorption material in place on the exhaust-gas upstream side of an $NO_x$ reduction catalyst that comprises a lean $NO_x$ catalyst or $NH_3$ denitration catalyst. In accordance with such an exhaust-gas converting apparatus, $NO_x$ are adsorbed onto the $NO_x$ adsorption material in low-temperature region, and thereafter $NO_x$, which have been released from the $NO_x$ adsorption material, are reduced and then converted by the downstream-side $NO_x$ reduction catalyst in high-temperature region. Therefore, it is possible to inhibit the discharge of $NO_x$ from low-temperature region and up to high-temperature region.

As such an $NO_x$ adsorption material, one in which Pt is supported on alumina is exemplified in Japanese Unexamined Patent Publication (KOKAI) Gazette No. 2000-230,414, and absorbing $NO_x$ at such temperatures as up to about 230° C. is set forth therein. Moreover, an $NO_x$ adsorption material, which comprises zeolite in which at least one member being selected from the group consisting of Fe, Cu and Co is supported by means of ion exchange, is set forth in Japanese Unexamined Patent Publication (KOKAI) Gazette No. 2007-160,168. In addition, an $NO_x$ adsorption material, which comprises at least one oxide that is selected from the group consisting of Co, Fe and Ni, is set forth in Japanese Unexamined Patent Publication (KOKAI) Gazette No. 2001-198,455, and adsorbing $NO_x$ in low-temperature region of 40° C. or less is set forth therein.

Furthermore, in Japanese Unexamined Patent Publication (KOKAI) Gazette No. 2007-160,168, the following are set forth: the zeolite on which at least one member that is selected from the group consisting of Fe, Cu and Co is supported by means of ion exchange demonstrates high $NO_x$ adsorbing capability from such ordinary temperature as room temperature approximately.

Incidentally, in a case where an $NO_x$ adsorption material and an $NO_x$ reduction catalyst are put in place in the exhaust-gas flow passage of automobile, the $NO_x$ adsorption material and $NO_x$ reduction catalyst are accommodated within a cylinder-shaped converter. However, within the cylinder-shaped converter, a temperature distribution occurs in which the axially central section becomes higher temperatures and the outer peripheral section becomes lower temperatures. Moreover, in general, the temperature is higher on the more upstream side, and the temperature becomes lower on the more downstream side.

Consequently, in a case where an $NO_x$ adsorption material exhibiting comparatively low temperatures at which $NO_x$ are eliminated therefrom is used, $NO_x$ that are released from the $NO_x$ adsorption material have been discharged as they are when the downstream-side $NO_x$ reduction catalyst does not reach up to the activation temperature. Moreover, in a case where an $NO_x$ adsorption material exhibiting comparatively high temperatures at which $NO_x$ are eliminated therefrom is used, there might be such an instance that the amount of $NO_x$ flowing into the $NO_x$ reduction catalyst becomes an excessive amount that surpasses the ability of the $NO_x$ reduction catalyst, because no $NO_x$ can be adsorbed after the $NO_x$ adsorption amount of the $NO_x$ adsorption material has been saturated; if such is the case, an amount of get-past $NO_x$, which have been discharged without being reduced by the $NO_x$ reduction catalyst, has become greater.

Patent Literature No. 1: Japanese Unexamined Patent Publication (KOKAI) Gazette No. 10-146,528;
Patent Literature No. 2: Japanese Unexamined Patent Publication (KOKAI) Gazette No. 2000-230,414;
Patent Literature No. 3: Japanese Unexamined Patent Publication (KOKAI) Gazette No. 2001-198,455; and
Patent Literature No. 4: Japanese Unexamined Patent Publication (KOKAI) Gazette No. 2007-160,168

DISCLOSURE OF THE INVENTION

Assignment to be Solved by the Invention

The present invention is one which has been done in view of the aforementioned circumstances, and it is an assignment to be solved not only to adsorb $NO_x$ efficiently from low-temperature region and up to high-temperature region but also to reduce an amount of $NO_x$ being discharged from an $NO_x$ reduction catalyst to be put in place on the exhaust-gas downstream side.

Means for Solving the Assignment

A characteristic of an $NO_x$ adsorbing apparatus according to the present invention which solves the aforementioned assignment lies in that:

it includes a first $NO_x$ adsorption material exhibiting a peak temperature being 200° C. or less at which an elimination amount of adsorbed $NO_x$ becomes the maximum, and a second $NO_x$ adsorption material exhibiting a peak temperature surpassing 200° C. at which an elimination amount of adsorbed $NO_x$ becomes the maximum; and the first $NO_x$ adsorption material is put in place on an exhaust-gas upstream side, and the second $NO_x$ adsorption material is put in place on an exhaust-gas downstream side of the first $NO_x$ adsorption material.

Moreover, a characteristic of an exhaust-gas converting apparatus according to the present invention lies in that: it is completed by putting an $NO_x$ reduction catalyst for reducing $NO_x$ on an exhaust-gas downstream side of the $NO_x$ adsorbing apparatus according to the present invention.

Effect of the Invention

In accordance with the $NO_x$ adsorbing apparatus according to the present invention, the first $NO_x$ adsorption material adsorbs $NO_x$ in low-temperature region where the exhaust-gas temperature is 200° C. or less. Therefore, in accordance with the exhaust-gas converting apparatus according to the present invention, $NO_x$ are inhibited from flowing into the $NO_x$ reduction catalyst that is put in place on a downstream side of the $NO_x$ adsorbing apparatus. By means of this setting, it is possible to reduce an amount of $NO_x$ being discharged, even when the $NO_x$ reduction catalyst does not reach the activation temperature.

And, when the exhaust-gas temperature surpasses 200° C., although $NO_x$ are eliminated from the first $NO_x$ adsorption material, the downstream-side second $NO_x$ adsorption material adsorb the resulting $NO_x$ again. Therefore, it is possible to reduce an amount of $NO_x$ flowing into the $NO_x$ reduction catalyst that is put in place on a downstream-side of the $NO_x$ adsorbing apparatus. By means of this setting, in accordance with the exhaust-gas converting apparatus according to the present invention, it is possible to reduce an amount of get-past $NO_x$, because an amount of $NO_x$ flowing into the $NO_x$ reduction catalyst is inhibited from becoming an excessive amount that surpasses the ability of the $NO_x$ reduction catalyst.

EXPLANATION ON REFERENCE NUMERALS

Figure 1:
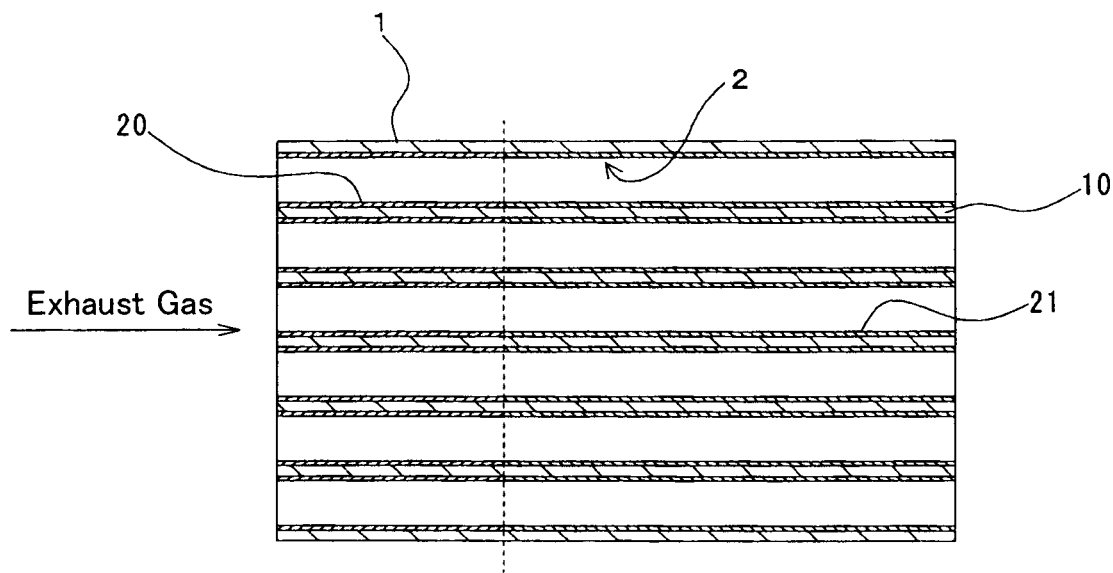
FIG. 1 is an explanatory cross-sectional diagram for illustrating an $NO_x$ adsorbing apparatus that is directed to an example of the present invention.

1: Honeycomb Substrate
2: $NO_x$ Adsorption Material
20: First $NO_x$-adsorption-material Layer
21: Second $NO_x$-adsorption-material Layer

BEST MODE FOR CARRYING OUT THE INVENTION

In an $NO_x$ adsorbing apparatus according to the present invention, a first $NO_x$ adsorption material is put in place on an exhaust-gas upstream side, and a second $NO_x$ adsorption material is put in place on an exhaust-gas downstream side thereof.

The first $NO_x$ adsorption material is one which exhibits a peak temperature being 200° C. or less at which an elimination amount of adsorbed $NO_x$ becomes the maximum. An $NO_x$ reduction catalyst, which is to be put in place on an exhaust-gas downstream of the $NO_x$ adsorbing apparatus according to the present invention, comes to have an activated area from around about 250° C. Therefore, the first $NO_x$ adsorption material is adapted into one which exhibits a peak temperature being 200° C. or less at which an elimination amount of adsorbed $NO_x$ becomes the maximum.

It is desirable that the first $NO_x$ adsorption material can exhibit an $NO_x$ adsorption amount at 50° C. that is 0.1 part by mass or more with respect to 100 parts by mass of the first $NO_x$ adsorption material. By adapting the first $NO_x$ adsorption material into one which exhibits such a great $NO_x$ adsorption amount at low temperatures, it is possible to furthermore inhibit $NO_x$ from flowing into the $NO_x$ reduction catalyst that is put in place on an exhaust-gas downstream side, and thereby it is possible to furthermore reduce an amount of $NO_x$ being discharged.

As for this first $NO_x$ adsorption material, it is possible to use the following zeolites, for instance, ferrierite, ZSM-5, mordenite, type Y zeolite, type β zeolite, type X zeolite, type L zeolite, silicalite, and synthetic zeolite that is produced by means of forming gel by adding template material to silica sol, subjecting it to hydrothermal synthesis and thereafter calcining it, and the like. Among them, ZSM-5 and type β zeolite, which exhibit a low peak temperature at which an elimination amount of $NO_x$ becomes the maximum, are preferable. Moreover, it is also possible to use modified zeolites that are made by subjecting these zeolites to aluminum elimination treatment. As for the aluminum elimination treatment, acid treatments, boiling-water treatments, steam treatments, and so forth, have been known.

Moreover, it is preferable as well to use zeolite on which Fe, Ag, Cu, Mn, or the like, is supported by means of ion exchange. In accordance with such ion-exchanged zeolite, high $NO_x$ absorbing capability is demonstrated even at such ordinary temperature as room temperature approximately, though the reason has not been clear yet.

Note that it is allowable that, in addition to zeolite, another porous oxide, such as $Al_2O_3$, $ZrO_2$ or $TiO_2$, can be included in the first $NO_x$ adsorption material. However, it is desirable that a content of the other porous oxide can be set to 50% by mass or less, because an $NO_x$ absorption amount in low-temperature region lowers by the extent of the content of the other porous oxide when it becomes greater.

The second $NO_x$ adsorption material is one which exhibits a peak temperature surpassing 200° C. at which an elimination amount of adsorbed $NO_x$ becomes the maximum. An $NO_x$ reduction catalyst, which is to be put in place on an exhaust-gas downstream of the $NO_x$ adsorbing apparatus according to the present invention, comes to have an activated area from around about 250° C. Therefore, by putting the second $NO_x$ adsorption material, which exhibits a peak temperature surpassing 200° C. at which an elimination amount of adsorbed $NO_x$ becomes the maximum, on a downstream side, it is possible to adsorb $NO_x$, which have been eliminated from the first $NO_x$ adsorption material, onto the second $NO_x$ adsorption material again, and accordingly it is possible to adsorb $NO_x$ up to that peak temperature. Consequently, it is possible to reduce an amount of $NO_x$ that flow into the $NO_x$ reduction catalyst. In a case where it becomes such a temperature that surpasses 200° C., $NO_x$ are reduced and then converted by means of the $NO_x$ reduction catalyst, because the $NO_x$ reduction catalyst comes to have an activated area. Therefore, an amount of $NO_x$ flowing into the $NO_x$ reduction catalyst is inhibited from becoming an excessive amount that surpasses the ability of the $NO_x$ reduction catalyst, and thereby it is possible to reduce an amount of get-past $NO_x$.

As for this second $NO_x$ adsorption material, it is possible to use ceria whose basicity is high, alumina whose specific surface area is large, and the like. Above all, it is desirable that it can include ceria at least. It is also allowable to use ceria-zirconia composite oxides, and so forth. Moreover, in addition to ceria, it is even permissible to include an oxide of another element that is selected the group consisting of La, Pr, Zr and Nd, and so on, or another porous oxide, such as $Al_2O_3$, $ZrO_2$ or $TiO_2$. Note that it is desirable that the other-element oxide other than ceria can be set to 80% by mass or less with respect to ceria. When the other-element oxide is included beyond this range, the content of ceria decreases relatively so that an adsorption amount of $NO_x$ decreases.

It is desirable that the second $NO_x$ adsorption material can exhibit an $NO_x$ adsorption amount at 200° C. that is 0.1 part by mass or more with respect to 100 parts by mass of the second $NO_x$ adsorption material. By doing thusly, it is possible to sufficiently inhibit $NO_x$, which have been eliminated from the first $NO_x$ adsorption material, from flowing into the $NO_x$ reduction catalyst during the period from the time that $NO_x$ start being eliminated and up to the time that the $NO_x$ reduction catalyst being put in place on a downstream side reaches the activation temperature, and thereby it is possible to furthermore reduce an amount of $NO_x$ being discharged.

Although the $NO_x$ adsorbing apparatus according to the present invention demonstrates advantageous effects without ever supporting noble metals and the like thereon, it is even possible to support a noble metal such as Pt, Pd or Rh thereon depending on circumstances. For example, when supporting a small amount of noble metal on the second $NO_x$ adsorbent material, it becomes feasible to oxidize NO in exhaust gases at 200° C. or more and then turn it into $NO_2$. Accordingly, the adsorption of $NO_x$ onto the second $NO_x$ adsorption material is facilitated, and thereby the $NO_x$ adsorbing capability is improved. It is possible to set a supporting amount of noble metal in this instance to 0.01-2% by mass with respect to the second $NO_x$ adsorbent material.

It is possible to constitute the $NO_x$ adsorbing apparatus according to the present invention of a first pellet being made by molding the first $NO_x$ adsorbent material, and a second pellet being made by molding the second $NO_x$ adsorbent material. Alternatively, it is allowable to put one in which a coating layer comprising the first $NO_x$ adsorbent material is formed on a supporter substrate, such as a honeycomb substrate or foamed substrate, in place on an exhaust-gas upstream side, and then to put another one in which a coating layer comprising the second $NO_x$ adsorbent material is formed on another similar supporter substrate in place on a downstream side thereof. In addition, it is even permissible to use one and only supporter substrate, to form a coating layer comprising the first $NO_x$ adsorbent material on its upstream side, and then to form another coating layer comprising the second $NO_x$ adsorbent material on its downstream side.

As for the supporter substrate, it is possible to use monolithic substrates that are formed from heat-resistant ceramics such as cordierite and SiC, or metallic substrates that are formed from metallic foils.

In the case where two kinds of coating layers are formed on an exhaust-gas upstream side and exhaust-gas downstream side of one and only supporter substrate, it is desirable to form a coating layer comprising the first $NO_x$ adsorption material over a range of 1/10-1/2 of the entire length from the exhaust-gas inlet-side end face of the supporter substrate, and then to form another coating layer comprising the second $NO_x$ adsorption material on the entire downstream side thereof. By forming the first $NO_x$ adsorbent material and second $NO_x$ adsorbent material over these ranges, it is possible to make an $NO_x$ adsorption amount of the entire $NO_x$ adsorbing apparatus greater in temperature-rising atmospheres during the actual use.

It is preferable that the coating amounts of the first $NO_x$ adsorption material and second $NO_x$ adsorption material can be formed in an amount of at least 50 g or more per 1-liter supporter substrate; and it is desirable that they can be formed in an amount of 100 g or more pert-liter supporter substrate. This is because the greater the coating amounts are the greater the $NO_x$ adsorption amounts become. Note that, although the upper limits are not determined especially, it should fall in a range where the rise of pressure loss can be tolerated.

Although it is even feasible to use the $NO_x$ adsorbing apparatus according to the present invention independently, it is desirable to put it in place on an exhaust-gas upstream side of an $NO_x$ reduction catalyst, which converts $NO_x$ by means of reduction, to use. That is, an exhaust-gas converting apparatus according to the present invention is completed by putting an $NO_x$ reduction catalyst, which converts $NO_x$ by means of reduction, in place on an exhaust-gas downstream side of the $NO_x$ adsorbing apparatus according to the present invention. In accordance with this exhaust-gas converting apparatus, $NO_x$ are inhibited from flowing into the $NO_x$ reduction catalyst in low-temperature region where the exhaust-gas temperature is 200° C. or less because the first $NO_x$ adsorption material adsorbs $NO_x$ thereon. By means of this setting, it is possible to reduce an amount of $NO_x$ being discharged even when the $NO_x$ reduction catalyst does not reach the activation temperature.

And, when the exhaust-gas temperature surpasses 200° C., $NO_x$ are eliminated from the first $NO_x$ adsorption material, but the downstream-side second $NO_x$ adsorption material adsorbs the resulting $NO_x$ again. Therefore, it is possible to reduce an amount of $NO_x$ flowing into the $NO_x$ reduction catalyst. By means of this setting, an amount of $NO_x$ flowing into the $NO_x$ reduction catalyst is inhibited from becoming an excessive amount that surpasses the ability of the $NO_x$ reduction catalyst, and thereby it is possible to reduce an amount of get-past $NO_x$.

As for the $NO_x$ reduction catalysts, lean $NO_x$ catalysts, $NO_x$ storage-and-reduction catalysts, $NH_3$ denitration catalysts, and the like, are exemplified.

EXAMPLES

Hereinafter, the present invention will be explained in detail by means of examples and comparative examples.

Example No. 1

An $NO_x$ adsorbing apparatus that is directed to an example of the present invention is illustrated in FIG. 1. This $NO_x$ adsorbing apparatus comprises a honeycomb substrate 1 that is made of cordierite, an $NO_x$ adsorbent material 2 that is coated on the surface of the honeycomb substrate 1's cellular partition walls 10. The $NO_x$ adsorbent material 2 comprises a first $NO_x$-adsorbent-material layer 20 that is formed on the exhaust-gas upstream side over a range of ⅓ of the entire length, and a second $NO_x$-adsorbent-material layer 21 that is formed on the exhaust-gas downstream side of the first $NO_x$-adsorbent-layer 20. Hereinafter, a production process for the $NO_x$ adsorbent material 2 will be explained to substitute for the detailed explanations on the constitution.

First of all, an Fe/ZSM-5 powder on which Fe was supported by means of ion exchange was made ready. A slurry "A" was prepared by mixing 100 parts by mass of this Fe/ZSM-5 powder and 15 parts by mass of alumina sol ($Al_2O_3$:10% by mass), which served as a binder, with ion-exchanged water.

Next, the honeycomb substrate 1 (straight flow; 30 mm in diameter; and 50 L in volume) being made of cordierite was made ready; and the aforementioned slurry "A" was wash coated over a range of ⅓ of the entire length from the exhaust-gas inlet-side end face, was dried, and was then calcined, thereby forming the first $NO_x$-adsorbent-material layer 20. The first $NO_x$-adsorbent-material layer 20 was formed in an amount of 150 g per 1 liter of the honeycomb substrate 1.

Next, a slurry "B" was prepared by mixing 150 parts by mass of a $CeO_2$ powder and 15 parts by mass of ceria sol ($CeO_2$:10% by mass), which served as a binder, with ion-exchanged water. And, the slurry "B" was wash coated from the exhaust-gas outlet-side end face of the honeycomb substrate 1 in which the first $NO_x$-adsorbent-material layer 20 was formed over a range of ⅔ of the entire length, was dried, and was then calcined, thereby forming the second $NO_x$-adsorbent-material layer 21. The second $NO_x$-adsorbent-material layer 21 was formed in an amount of 150 g per 1 liter of the honeycomb substrate 1.

Comparative Example No. 1

The same honeycomb substrate 1 as that of Example No. 1 was made ready; and the aforementioned slurry "A" was wash coated over the entire length, was dried, and was then calcined, thereby forming the first $NO_x$-adsorbent-material layer 20, which comprised Fe/ZSM-5, over the entire length. The first $NO_x$-adsorbent-material layer 20 was formed in an amount of 150 g per 1 liter of the honeycomb substrate 1.

Comparative Example No. 2

The same honeycomb substrate 1 as that of Example No. 1 was made ready; and the aforementioned slurry "B" was wash coated over the entire length, was dried, and was then calcined, thereby forming the second $NO_x$-adsorbent-material layer 21, which comprised $CeO_2$, over the entire length. The second $NO_x$-adsorbent-material layer 21 was formed in an amount of 150 g per 1 liter of the honeycomb substrate 1.

Comparative Example No. 3

The same honeycomb substrate 1 as that of Example No. 1 was made ready; the aforementioned slurry "B" was wash coated over a range of ⅓ of the entire length from the exhaust-gas inlet-side end face, thereby forming the second $NO_x$-adsorption-material layer 21; and then the aforementioned slurry "A" was wash coated over a range of ⅔ of the entire length from the exhaust-gas outlet-side end face, thereby forming the first $NO_x$-adsorption-material layer 20. The upstream-side second $NO_x$-adsorbent-material layer 21, and the downstream-side first $NO_x$-adsorption-material layer 20 were formed in an amount of 150 g per 1 liter of the honeycomb substrate 1, respectively.

Testing Example No. 1

The respective $NO_x$ adsorbing apparatuses according to Comparative Example No. 1 and Comparative Example No. 2 were put in place in an evaluating apparatus respectively, and $NO_x$ were then adsorbed at a predetermined temperature using a lean gas shown in Table 1 until being saturated. The respective $NO_x$ adsorbing apparatuses after having undergone the $NO_x$ adsorption were put in place in another evaluating apparatus respectively, and were then measured for an amount of $NO_x$ that were eliminated when the temperature was raised from room temperature and up to 550° C., at a rate of 10° C./minute respectively. The results are illustrated in FIG. 2.

TABLE 1

| | NO (ppm) | $C_3H_6$ (ppm) | $O_2$ (%) | $CO_2$ (%) | $H_2O$ (%) | $N_2$ |
|---|---|---|---|---|---|---|
| Lean Gas | 200 | 500 | 10 | 10 | 3 | Balance |

Figure 2:
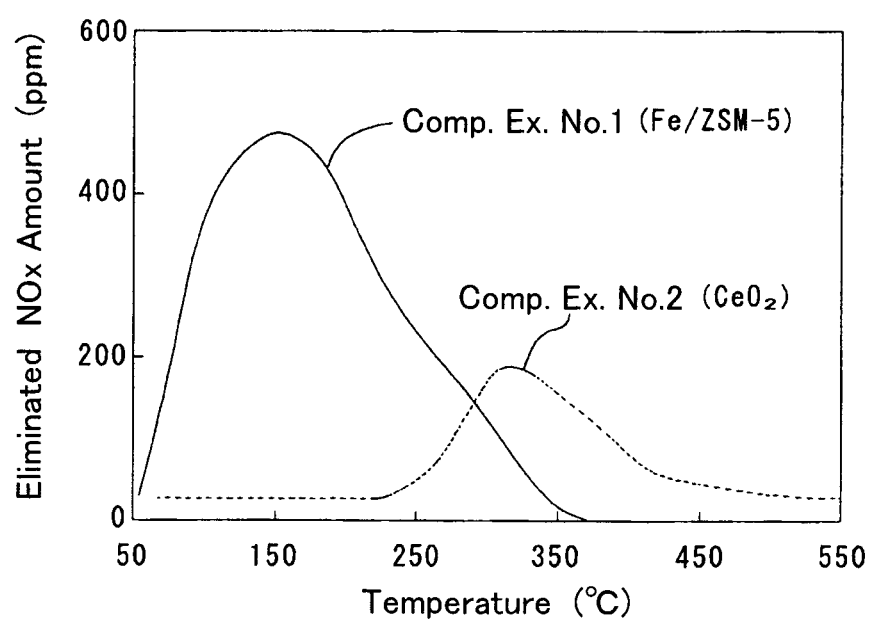
FIG. 2 is a graph for illustrating relationships between the $NO_x$ concentrations in outlet gases from $NO_x$ adsorbing apparatuses according to comparative examples and the temperatures thereof.

From FIG. 2, it is seen that the peak temperature at which the elimination amount of adsorbed $NO_x$ became the maximum was about 150° C. in the $NO_x$ adsorbing apparatus according to Comparative Example No. 1, whereas that was about 280° C. in the $NO_x$ adsorbing apparatus according to Comparative Example No. 2. Specifically, the peak temperature at which the elimination amount of adsorbed $NO_x$ becomes the maximum is 200° C. or less in Fe/ZSM-5, and that surpasses 200° C. in $CeO_2$.

Testing Example No. 2

The respective $NO_x$ adsorbing apparatuses according to Example No. 1 and Comparative Example Nos. 1-3 were put in place in still another evaluating apparatus respectively, and the temperature was raised from room temperature and up to 300° C. at a rate of 15° C./minute while flowing the lean gas shown in Table 1 through them at a flow volume of 10

L/minute. $NO_x$ concentrations in gases that had been discharged from the $NO_x$ adsorbing apparatuses on that occasion were measured continuously, and the results are illustrated in FIG. 3.

Figure 3:
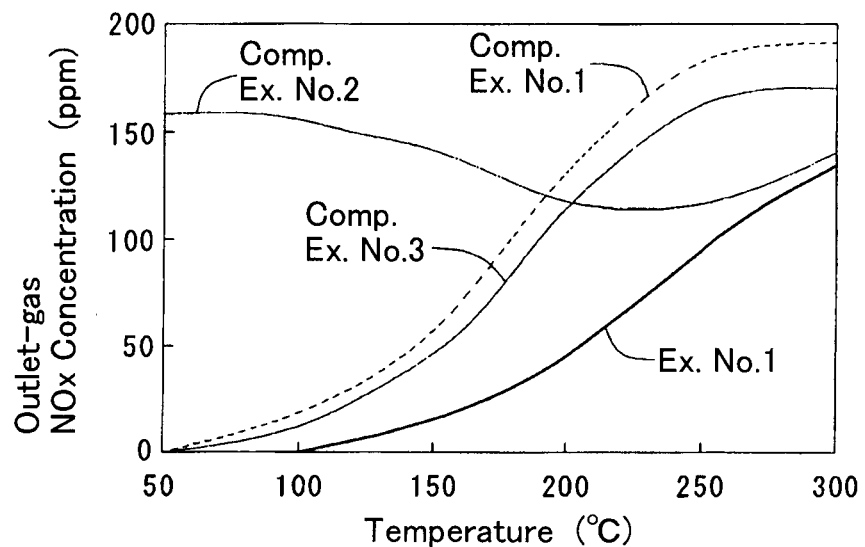
FIG. 3 is a graph for illustrating relationships between the $NO_x$ concentrations in outlet gases from $NO_x$ adsorbing apparatuses and the temperatures thereof.
Figure 4:
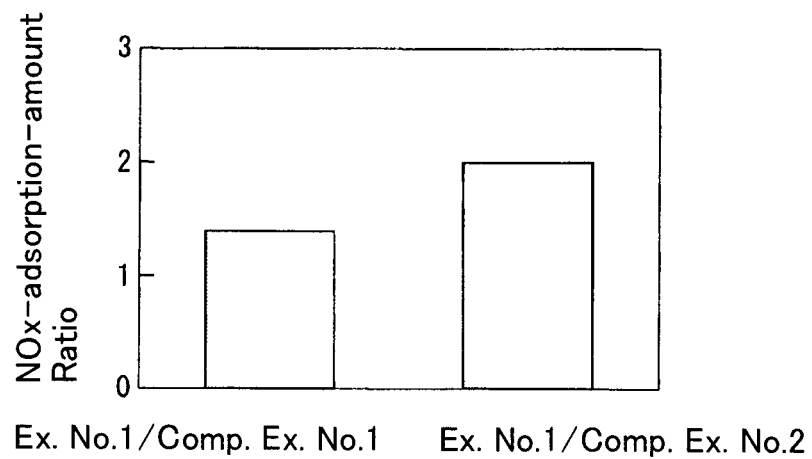
FIG. 4 is a graph for illustrating $NO_x$-adsorption-amount ratios.

Note that, in FIG. 3, the amount of $NO_x$ being adsorbed on each of the $NO_x$ adsorbing apparatuses is expressed as the area of the slant line in FIG. 3 in the case of Example No. 1, for instance. Therefore, when calculating an area ratio between that and the amount of $NO_x$ being adsorbed on the $NO_x$ adsorbing apparatuses according to comparative examples, it is possible to calculate ratios of the $NO_x$ adsorption amounts. Ratios of the amount of $NO_x$ being adsorbed on the $NO_x$ adsorbing apparatus according to Example No. 1 with respect to the amounts of $NO_x$ being adsorbed on the $NO_x$ adsorbing apparatuses according to Comparative Example No. 1 and Comparative Example No. 2 were thus measured, and the results are illustrated in FIG. 4.

From FIG. 3, although the $NO_x$ adsorbing capability was high on low-temperature side in the $NO_x$ adsorbing apparatuses that are directed to Comparative Example No. 1 and Comparative Example No. 3, the elimination of $NO_x$ was great on high-temperature side. This results from the fact that $NO_x$ had been eliminated from the first $NO_x$-adsorption-material layer 20 that was formed on the downstream side. Moreover, although the elimination of $NO_x$ was less likely to occur on high-temperature side in the $NO_x$ adsorbing apparatus that is directed to Comparative Example No. 2, the $NO_x$ adsorbing capability was low on low-temperature side. This is because the first $NO_x$-adsorption-material layer 20, which adsorbed $NO_x$ well in low-temperature region, was formed on the downstream side.

On the other hand, it is understood that the amount of discharged $NO_x$ was less over the entire region from low-temperature region and up to high-temperature region in the $NO_x$ adsorbing apparatus that is directed to Example No. 1, compared with those of the $NO_x$ adsorbing apparatuses that are directed to Comparative Example Nos. 1-3, and that the amount of adsorbed $NO_x$ was about 1.4 times as great as that of Comparative Example No. 1, and was about twice as great as that of Comparative Example No. 2; it is evident that this is an advantageous effect that results from forming the first $NO_x$-adsorbent-material layer 20 on an upstream side and forming the second $NO_x$-adsorbent-material layer 21 on a downstream side thereof.

Testing Example No. 3

The same slurry "A" and slurry "B" as those of Example No. 1 were used; the forming range of the first $NO_x$-adsorption-material layer 20 was set at the following ten levels: 0, 1/30, 1/15, 1/10, 1/5, 1/3, 2/5, 1/2, 3/5 and 1/1 of the overall length from the exhaust-gas inlet-side end face of the honeycomb substrate 1; and the second $NO_x$-adsorption-material layer 21 was formed on the remaining ranges. One in which the first $NO_x$-adsorption-material layer 20 was set at 0 (zero) is equivalent to the $NO_x$ adsorbing apparatus according to Comparative Example No. 2; another one in which it was set at 1/3 is equivalent to the $NO_x$ adsorbing apparatus according to Example No. 1; and still another one in which it was set at 1/1 is equivalent to Comparative Example No. 1. The first $NO_x$-adsorbent-material layer 20, and the second $NO_x$-adsorption-material layer 21 were formed in an amount of 150 g per 1 liter of the honeycomb substrate 1, respectively.

Each of the resulting $NO_x$ adsorbing apparatuses was put in place in an evaluating apparatus respectively, and was measured continuously for $NO_x$ concentrations in gases that had been discharged when the temperature was raised from room temperature and up to 300° C. in the same manner as Testing Example No. 2. And, ratios of the $NO_x$ adsorption amounts with respect to the amount of $NO_x$ being adsorbed on the one (i.e., Comparative Example No. 2) in which the first $NO_x$-adsorption-material layer 20 was set at 0 (zero) were calculated respectively, and the results are illustrated in FIG. 5.

Figure 5:
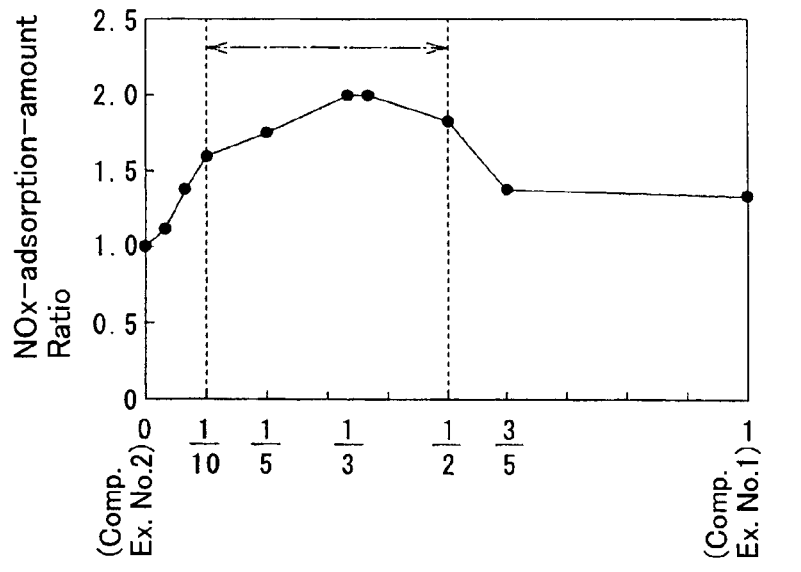
FIG. 5 is a graph for illustrating relationships between the formation ranges of upstream-side first $NO_x$-adsorption-material layer and the $NO_x$-adsorption-amount ratios thereof.

From FIG. 5, it is evident that it is desirable that the formation range of the first $NO_x$-adsorption-material layer 20 can fall in a range of 1/10-1/2 of the overall length from the exhaust-gas inlet-side end face.

Testing Example No. 4

In an $NO_x$ adsorbing apparatus in which the first $NO_x$-adsorption-material layer 20 was formed on a range of 1/3 of the overall length from the exhaust-gas inlet-side end face; and the second $NO_x$-adsorption-material layer 21 was formed on a range of 2/3 of the overall length from the exhaust-gas outlet-side end face; in the same manner as Example No. 1; the first $NO_x$-adsorption-material layer 20 was formed in an amount of 150 g fixedly per 1 liter of the honeycomb substrate 1, and the second $NO_x$-adsorption-material layer 21 was formed in an amount that was set at the following eight levels: 0 g, 15 g, 30 g, 50 g, 100 g, 150 g, 200 g and 250 g, respectively, per 1 liter of the honeycomb substrate 1. Regarding one with 0 g, the first $NO_x$-adsorption-material layer 20 was formed over the entire length, and this one is one that is identical with Comparative Example No. 1.

Each of the resulting $NO_x$ adsorbing apparatuses was put in place in an evaluating apparatus respectively, and was measured continuously for $NO_x$ concentrations in gases that had been discharged when the temperature was raised from room temperature and up to 300° C. in the same manner as Testing Example No. 2. And, ratios of the $NO_x$ adsorption amounts with respect to the amount of $NO_x$ being adsorbed on the one (i.e., Comparative Example No. 1) in which the second $NO_x$-adsorption-material layer 21 was set at 0 (zero) were calculated respectively, and the results are illustrated in FIG. 6.

Moreover, in an $NO_x$ adsorbing apparatus in which the first $NO_x$-adsorption-material layer 20 was formed on a range of 1/3 of the overall length from the exhaust-gas inlet-side end face; and the second $NO_x$-adsorption-material layer 21 was formed on a range of 2/3 of the overall length from the exhaust-gas outlet-side end face; in the same manner as Example No. 1; the second $NO_x$-adsorption-material layer 21 was formed in an amount of 150 g fixedly per 1 liter of the honeycomb substrate 1, and the first $NO_x$-adsorption-material layer 20 was formed in an amount that was set at the following eight levels: 0 g, 15 g, 30 g, 50 g, 100 g, 150 g, 200 g and 250 g, respectively, per 1 liter of the honeycomb substrate 1. Regarding one with 0 g, the second $NO_x$-adsorption-material layer 21 was formed over the entire length, and this one is one that is identical with Comparative Example No. 2.

Figure 7:
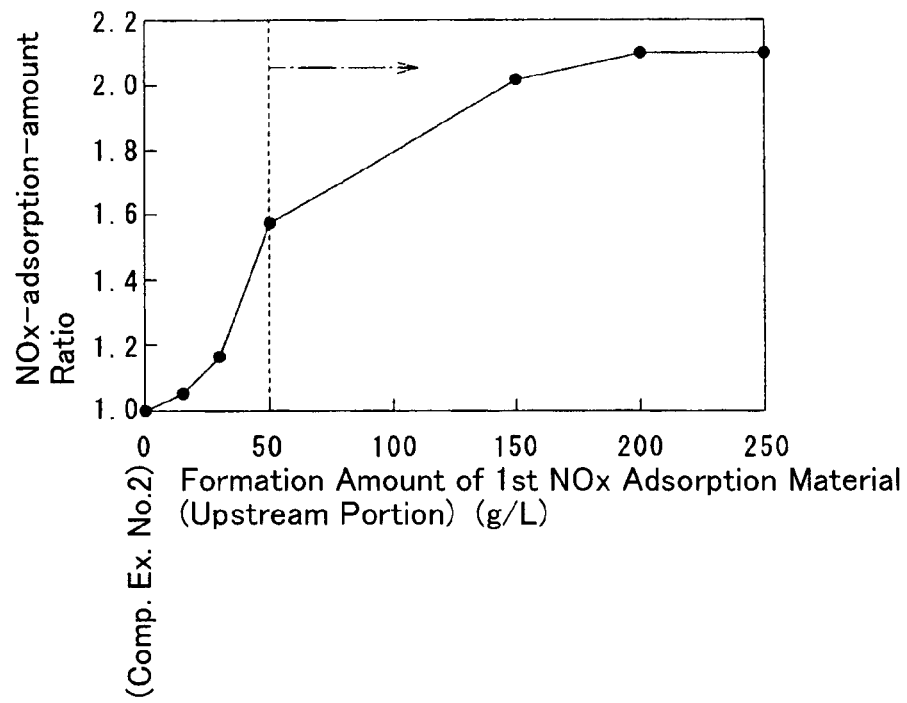
FIG. 7 is a graph for illustrating relationships between the formation amounts of upstream-side first $NO_x$-adsorption-material layer and the $NO_x$-adsorption-amount ratios thereof.

Each of the resulting $NO_x$ adsorbing apparatuses was put in place in an evaluating apparatus respectively, and was measured continuously for $NO_x$ concentrations in gases that had been discharged when the temperature was raised from room temperature and up to 300° C. in the same manner as Testing Example No. 2. And, ratios of the $NO_x$ adsorption amounts with respect to the amount of $NO_x$ being adsorbed on the one (i.e., Comparative Example No. 2) in which the first $NO_x$-adsorption-material layer 20 was set at 0 (zero) were calculated respectively, and the results are illustrated in FIG. 7.

Figure 6:
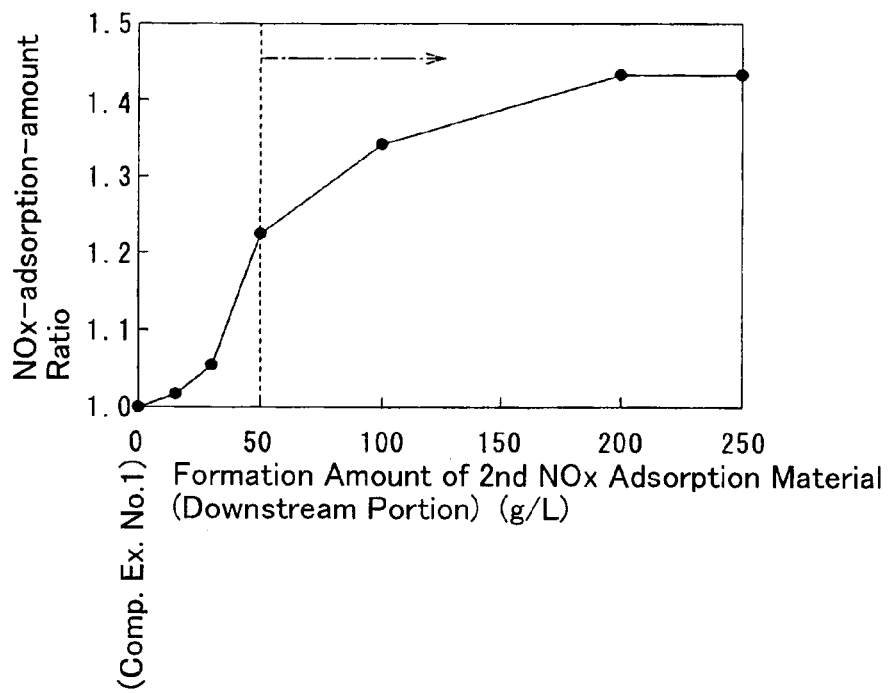
FIG. 6 is a graph for illustrating relationships between the formation amounts of downstream-side second $NO_x$-adsorption-material layer and the $NO_x$ adsorption-amount ratios thereof.

From FIG. 6, it is seen that it is preferable that the formation amount of the downstream-side second $NO_x$-adsorption-material layer 21 can be 50 g or more per 1 liter of the honeycomb substrate 1, and that it is furthermore desirable that it can be 100 g or more. Moreover, from FIG. 7, it is seen that it is preferable that the formation amount of the upstream-side first $NO_x$-adsorption-material layer 20 can also be 50 g or more per 1 liter of the honeycomb substrate 1, and that it is furthermore desirable that it can also be 100 g or more.

Example No. 2

Figure 8:
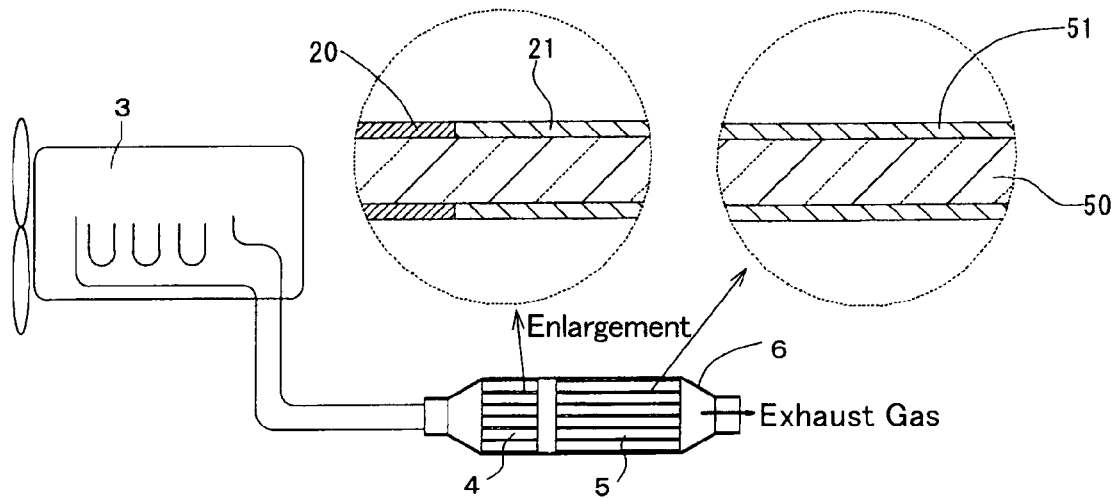
FIG. 8 is an explanatory diagram for illustrating an exhaust-gas converting apparatus that is directed to an example of the present invention.

In FIG. 8, an exhaust-gas converting apparatus that is directed to an example of the present invention is illustrated. This exhaust-gas converting apparatus is constituted of an $NO_x$ adsorbing apparatus 4 that is put in place in an exhaust system of a lean-burn engine 3, and an $NO_x$ storage-and-reduction catalyst 5 that is put in place on an exhaust-gas downstream side of the $NO_x$ adsorbing apparatus 4. The $NO_x$ adsorbing apparatus 4 is one that is the same as the $NO_x$ adsorbing apparatus that is directed to Example No. 1. The $NO_x$ adsorbing apparatus 4 and $NO_x$ storage-and-reduction catalyst 5 are accommodated in series within a catalytic converter 6.

The $NO_x$ storage-and-reduction catalyst 5 comprises a honeycomb substrate 50, and a catalytic layer 51 that is formed on the surface of its cellular partition walls; the catalytic layer 51 is constituted of a supporter that comprises $Al_2O_3$, $TiO_2$ and $ZrO_2$, and Pt, serving as a noble metal, K, Ba as well as Li, each serving as an $NO_x$ storage material, that are supported on that supporter.

The lean-burn engine 3 is controlled so as to be combusted in lean always but to be combusted in rich intermittently. When lean exhaust gases in low-temperature region such as 200° C. or less flow into the exhaust-gas converting apparatus according to the present example at the time of starting up, and the like, $NO_x$ in the exhaust gases are adsorbed onto the first $NO_x$-adsorption-material layer 20 that is formed on an upstream side of the $NO_x$ adsorbing apparatus 4, and accordingly they scarcely flow into the $NO_x$ storage-and-reduction catalyst 5. Consequently, it is possible to prevent the discharge of $NO_x$ preemptively even when the $NO_x$ storage-and-reduction catalyst 5 is not in the activation area.

The $NO_x$ storage-and-reduction catalyst 5 is unactivated unless it becomes about 250° C. or more. Meanwhile, $NO_x$, which have been adsorbed on the first $NO_x$-adsorption-material layer 20, are eliminated when the exhaust-gas temperature surpasses 200° C. However, the eliminated $NO_x$ hardly flow into the $NO_x$ storage-and-reduction catalyst 5, because they are adsorbed onto the downstream-side second $NO_x$-adsorption-material layer 21 again. Therefore, it is possible to prevent the discharge of $NO_x$ preemptively even before the $NO_x$ storage-and-reduction catalyst 5 reaches the activation temperature.

Since the $NO_x$ storage-and-reduction catalyst 5 is in the activation area when the exhaust-gas temperature becomes about 250° C. or more, $NO_x$ that have been included in the exhaust gases originally, and $NO_x$ that have been eliminated from the first $NO_x$-adsorption-material layer 20 and second $NO_x$-adsorption-material layer 21 are stored in the $NO_x$ storage-and-reduction catalyst 5, and thereby the discharge is suppressed.

And, when rich-atmosphere exhaust gases are flowed thereinto, $NO_x$ that have been stored in the $NO_x$ storage-and-reduction catalyst 5 are emitted, and additionally $NO_x$ are reduced and then converted on the $NO_x$ storage-and-reduction catalyst 5 by means of reducing agents, such as HC, which exist abundantly in the ambient atmospheres.

Therefore, in accordance with the exhaust-gas converting catalyst according to the present example, it is possible to inhibit the discharge of $NO_x$ from low-temperature region and up to high-temperature region.

The invention claimed is:

1. An $NO_x$ adsorbing apparatus, comprising:
   a first $NO_x$ adsorption material exhibiting a peak temperature being 200° C. or less at which an elimination amount of adsorbed $NO_x$ becomes the maximum; and
   a second $NO_x$ adsorption material exhibiting a peak temperature surpassing 200° C. at which an elimination amount of adsorbed $NO_x$ becomes the maximum,
   wherein the first $NO_x$ adsorption material is located on an exhaust-gas upstream side, and the second $NO_x$ adsorption material is located on an exhaust-gas downstream side of the first $NO_x$ adsorption material, and
   wherein an $NO_x$ reduction catalyst for converting $NO_x$ via reduction is located on an exhaust as downstream side of the $NO_x$ adsorbing apparatus.

2. The $NO_x$ adsorbing apparatus as set forth in claim 1 comprising:
   a supporter substrate;
   an upstream-side coating layer being formed on an exhaust-gas upstream side of the supporter substrate, and including said first $NO_x$ adsorption material; and
   a downstream-side coating layer being formed on a more exhaust-gas downstream side than the upstream-side coating layer of the supporter substrate is, and including said second $NO_x$ adsorption material.

3. The $NO_x$ adsorbing apparatus as set forth in claim 2, wherein:
   the upstream-side coating layer is formed over a range of 1/10-1/2 of the entire length of the supporter substrate from an exhaust-gas inlet-side end face thereof; and
   the downstream-side coating layer is formed on the entire downstream side from said upstream-side coating layer.

4. The $NO_x$ adsorbing apparatus as set forth in claim 1, wherein said first $NO_x$ adsorption material exhibits an $NO_x$ adsorption amount at 50° C. that is 0.1 part by mass or more with respect to 100 parts by mass of said first $NO_x$ adsorption material.

5. The $NO_x$ adsorbing apparatus as set forth in claim 1, wherein said second $NO_x$ adsorption material exhibits an $NO_x$ adsorption amount at 200° C. that is 0.1 part by mass or more with respect to 100 parts by mass of said second $NO_x$ adsorption material.

* * * * *